Patented June 14, 1932

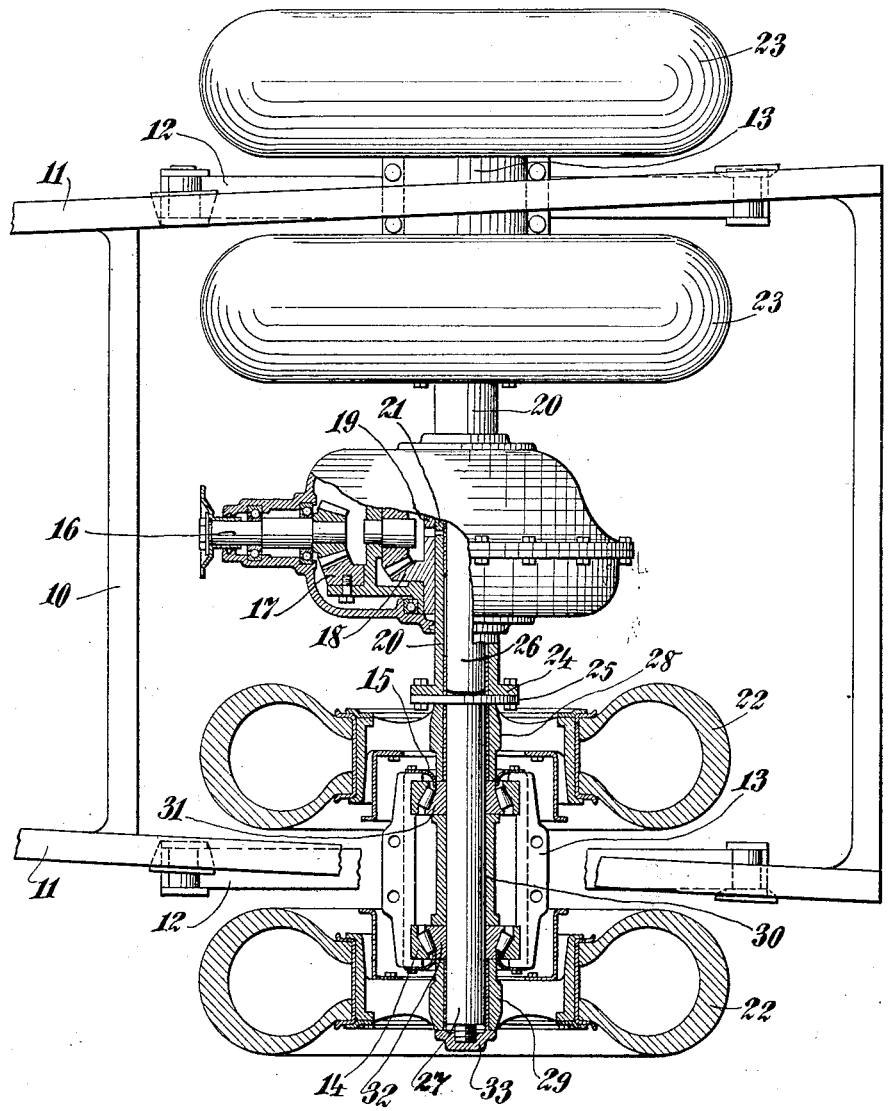

1,862,753

UNITED STATES PATENT OFFICE

LYMAN C. JOSEPHS, JR., AND ERVING R. GURNEY, OF ALLENTOWN, PENNSYLVANIA, ASSIGNORS TO INTERNATIONAL MOTOR COMPANY, OF NEW YORK, N. Y., A CORPORATION OF DELAWARE

DUAL WHEEL MOUNTING AND DRIVE

Application filed December 24, 1930. Serial No. 504,568.

The present invention relates to dual wheel mountings and drives therefor and embodies, more specifically, an improved dual wheel construction wherein two wheels are spaced from each other but mounted as a unit and driven from a common driving means whereby the frame members of the motor vehicle may be received between the spaced wheels to permit a greater frame width than obtainable where dual tires are mounted on a single wheel structure upon the outer sides of the vehicle frame.

Where vehicles carry dual tires, it is found that the limitation in permissible width imposed by the authorities materially restricts the chassis construction in that the width consumed by the dual tires is so great that the remaining width available for the chassis and spring materially detracts from the stability of the body. With a view to providing a dual wheel structure upon which dual tires are mounted, the frame members being received between the spaced wheels, the present invention has been designed, and the resulting stability afforded by vehicles constructed in accordance herewith is thus greatly increased.

An object of the invention, therefore, is to provide an improved form of dual wheel which is adapted to receive the side frame members of a motor vehicle between the respective wheels, the wheels being driven as a unit.

A further object of the invention is to provide, in a dual wheel structure of the above character, an improved mounting by means of which the wheel may be readily assembled and dismounted during service.

A further object of the invention is to provide in a dual wheel structure of the above character, a convenient means for driving the dual wheels as a unit, when effectively spaced to receive the side frame members therebetween.

Further objects, not specifically enumerated above, will be apparent as the invention is described in greater detail in connection with the accompanying drawing, wherein the single figure of the drawing is a plan view, partly broken away and in section, showing a dual wheel and drive structure constructed in accordance with the present invention, the side frame members and springs being received between the wheels upon opposite sides of the vehicle.

Referring to the above drawing, a vehicle chassis is indicated at 10, having side frame members 11 and springs 12. The springs may be secured to the frame members in any well known fashion and are secured to cylindrical housings 13 at the ends of which bearing cages 14 are mounted. Inwardly curving sealing discs 15 are provided between the ends of the housings 13 and the relatively rotatable members mounted therein.

The transmission shaft of the vehicle is connected to shaft section 16 and thus transmits power to differential ring gear 17 which apportions power between gears 18 and 19. The gears 18 and 19 are splined to the respective jack shafts 20 and 21 for driving the respective dual wheels and tires 22 and 23.

Inasmuch as the drive of these respective wheels and tires is the same upon each side of the differential, specific description will be made only in connection with the portion shown in section and the jack shaft 20 will thus be seen to be formed with a flange 24 which is secured to a flange 25 formed upon the shaft section 27. The jack shafts 20 and 21 are mounted upon a dead shaft section 26 to maintain the same in proper alignment and the tubes 30 receive dual wheel assemblies described more specifically hereinafter. The driving connection between the wheels and the respective jack shaft sections is effected by means of a nut 33 which is threaded down upon a shaft 27, the flange 25 of which is secured to flange 24 of the respective jack shaft 20. Wheel hubs 28 and 29, together with spacer sleeve 30 are thus rigidly clamped between the nut 33 and flange 25 and the drive is thus transmitted from the respective jack shafts 20 to the wheels 22 and 23.

Hubs 28 and 29 of the inner and outer wheels are spaced apart on shafts 27 by means of a spacing sleeve 30 and bearing races 31 and 32. The bearing races 31 and 32 cooperate with the bearings carried by the cages 14 to journal the wheel assemblies upon the housings 13. The end of shaft 27 is threaded to receive a nut 33 and thus keep the hubs and spacing elements in their proper positions.

It will be seen that the spacing sleeve 30 is of sufficient width to cause the wheels of the respective dual wheel assemblies to be spaced apart a sufficient distance to receive the side frame members and springs as described above. The structure is readily manufactured and assembled and affords an effective means of securing the wheels in driving relationship with the differential mechanism at the same time enabling the side frame members to be spaced apart sufficiently to provide adequate stability for the body of the vehicle.

While the invention has been described with specific reference to the accompanying drawing, it is not to be limited save as defined in the appended claims.

We claim as our invention:

1. A device of the character described comprising a power apportioning means, hollow aligned jack shafts driven by the apportioning means, a shaft section rotatably mounted within the jack shafts, a plurality of wheels driven by each jack shaft, and means to space the wheels apart and connect them as a unit to the respective jack shafts.

2. A device of the character described comprising a power apportioning means, jack shafts driven by the apportioning means, a plurality of wheels driven by each jack shaft, a shaft section secured to each jack shaft and mounting the wheels, flanges on the shaft sections secured to the jack shafts, a spacing sleeve over each shaft section between the respective wheels, and means to secure the wheels and sleeves to the respective shaft sections and against the respective flanges.

This specification signed this 15 day of December A. D. 1930.

LYMAN C. JOSEPHS, JR.
ERVING R. GURNEY.